US012212102B2

(12) United States Patent
He et al.

(10) Patent No.: US 12,212,102 B2
(45) Date of Patent: Jan. 28, 2025

(54) ELECTRICAL CONNECTOR

(71) Applicant: LOTES CO., LTD, Keelung (TW)

(72) Inventors: Zhi Li He, Keelung (TW); Wen Chang Chang, Keelung (TW); Jie Liao, Keelung (TW); Jin Zhu Wang, Keelung (TW)

(73) Assignee: LOTES CO., LTD, Keelung (TW)

( * ) Notice: Subject to any disclaimer, the term of this patent is extended or adjusted under 35 U.S.C. 154(b) by 361 days.

(21) Appl. No.: 17/971,769

(22) Filed: Oct. 24, 2022

(65) Prior Publication Data

US 2023/0148426 A1 May 11, 2023

(30) Foreign Application Priority Data

Nov. 8, 2021 (CN) ......................... 202111313723.3

(51) Int. Cl.
*H01R 13/6587* (2011.01)
*H01R 12/72* (2011.01)

(52) U.S. Cl.
CPC ....... *H01R 13/6587* (2013.01); *H01R 12/724* (2013.01)

(58) Field of Classification Search
CPC .............. H01R 13/658; H01R 13/6581; H01R 13/6585; H01R 13/6586; H01R 13/6587; H01R 12/70; H01R 12/71; H01R 12/72; H01R 12/722; H01R 12/724
USPC ..................................................... 439/607.07
See application file for complete search history.

(56) References Cited

U.S. PATENT DOCUMENTS

| | | | | |
|---|---|---|---|---|
| 7,789,676 | B2 | 9/2010 | Morgan et al. | |
| 8,641,448 | B2 | 2/2014 | Lappoehn | |
| 2023/0148426 | A1 * | 5/2023 | He ..................... | H01R 13/6477 439/607.07 |

FOREIGN PATENT DOCUMENTS

| | | | |
|---|---|---|---|
| CN | 1258836 | C | 6/2006 |
| CN | 101958474 | B | 7/2014 |
| CN | 103296537 | B | 10/2015 |
| CN | 104300253 | B | 4/2018 |
| CN | 105470732 | B | 10/2019 |
| CN | 212257798 | U | 12/2020 |
| CN | 113410678 | A | 9/2021 |

* cited by examiner

*Primary Examiner* — Khiem M Nguyen
(74) *Attorney, Agent, or Firm* — Locke Lord LLP; Tim Tingkang Xia, Esq.

(57) ABSTRACT

An electrical connector includes at least one terminal assembly. The terminal assembly includes: a first signal terminal and a second signal terminal being narrow-edge coupled; and an insulating block fixing the first signal terminal and the second signal terminal. A length of the first signal terminal is greater than a length of the second signal terminal. A first connecting portion of the first signal terminal is provided with at least one exposing area, which is exposed to the insulating block and exposed in air medium. The first connecting portion has at least one widening portion and at least one narrow portion connected to each other along a length direction thereof. A width of the widening portion is greater than a width of the narrow portion. The exposing area is provided at the widening portion. A second connecting portion of the second signal terminal is completely wrapped in the insulating block.

12 Claims, 13 Drawing Sheets

ELECTRICAL CONNECTOR

CROSS-REFERENCE TO RELATED PATENT APPLICATION

This non-provisional application claims priority to and the benefit of, pursuant to 35 U.S.C. § 119(a), patent application Serial No. CN202111313723.3 filed in China on Nov. 8, 2021. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and particularly to an electrical connector that may improve time delay of signal transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing electrical connector includes a plurality of pairs of differential signal terminals arranged in a row along a vertical direction. Each pair of the differential signal terminals include a first signal terminal and a second signal terminal arranged along the vertical direction and narrow-edge coupled. Each of the first signal terminal and the second signal terminal includes a contact portion used to be electrically connected to a mating connector, a conductive portion mounted on a circuit board, and a connecting portion connected between the contact portion and the conductive portion. Extending directions of the contact portion and the conductive portion are perpendicular to each other.

In the electrical connector, a length of the first signal terminal and a length of the second signal terminal are always different, which results in a time delay phenomenon existing in the signal transmission of the first signal terminal and the second signal terminal, thus affecting the signal transmission of the pair of the differential signal terminals. Currently, the connecting portion of the signal terminal having a shorter length in the pair of the differential signal terminals is generally deformed to become a snake-bending shape, such that the first signal terminal and the second signal terminal are in equal length structures, thus improving the time delay phenomenon caused by the different lengths. However, such improvement method may increase the forming difficulties of the signal terminals, and a distance between the portion in the snake-bending shape and the other signal terminal is increased, which is not conducive to performing signal coupling and characteristic impedance matching between the pair of the differential signal terminals.

Therefore, a heretofore unaddressed need to design a new electrical connector exists in the art to address the aforementioned deficiencies and inadequacies.

SUMMARY

The present invention is directed to an electrical connector, in which the capacitance value around the first connecting portion is reduced by the exposing area, thus shortening the signal transmission time of the longer first signal terminal, thereby improving the time delay of the signal transmission between the first signal terminal and the second signal terminal with different lengths; and the exposing area is provided at the widening portion, which reduces the impedance by increasing the width thereof, thereby remedying the impedance being increased due to the exposing area being exposed in the air medium, facilitating improving time delay of the signal transmission, balancing the impedance characteristics of the first signal terminal, and causing a lesser effect to the forming difficulties and the signal coupling of the first signal terminal and the second signal terminal.

To achieve the foregoing objective, the present invention adopts the following technical solutions. An electrical connector is configured to mate with a mating connector. The electrical connector includes at least one terminal assembly. Each of the at least one terminal assembly includes: a first signal terminal and a second signal terminal, arranged to form a pair of differential terminals and narrow-edge coupled to each other, wherein the first signal terminal has a first contact portion, a first conductive portion and a first connecting portion connecting the first contact portion and the first conductive portion, the second signal terminal has a second contact portion, a second conductive portion and a second connecting portion connecting the second contact portion and the second conductive portion, the first contact portion and the second contact portion are both configured to be in contact with the mating connector, the first conductive portion and the second conductive portion are both configured to be electrically connected to a corresponding electrical component, and a length of the first signal terminal is greater than a length of the second signal terminal; and an insulating block, fixing the first signal terminal and the second signal terminal; wherein the first connecting portion is provided with at least one exposing area, the exposing area is exposed to the insulating block and exposed in air medium, the first connecting portion has at least one widening portion and at least one narrow portion connected to each other along a length direction thereof, a width of the widening portion is greater than a width of the narrow portion, the exposing area is provided at the widening portion, and the second connecting portion is completely wrapped in the insulating block.

In certain embodiments, the first connecting portion and the second connecting portion both bend and extend, and the exposing area is located at a bending location of the first connecting portion.

In certain embodiments, the first connecting portion has a first narrow edge and a second narrow edge, the second connecting portion has a third narrow edge and a fourth narrow edge, the first narrow edge and the third narrow edge are coupled to each other, the first narrow edge and the second narrow edge at the widening portion protrude outward relatively than the first narrow edge and the second narrow edge at the narrow portion, and the first connecting portion and the second connecting portion are provided at an interval with a constant center distance.

In certain embodiments, the insulating block is provided with at least one groove, the groove is concavely provided from a surface of the insulating block toward a wide edge of the first connecting portion and a wide edge of the second connecting portion, and the groove extends along the first connecting portion.

In certain embodiments, the widening portion is further provided with a wrapping area being wrapped by the insulating block, the wrapping area is provided between the exposing area and the narrow portion along an extending direction of the first connecting portion.

In certain embodiments, each of the at least one terminal assembly further comprises a shielding shell, the shielding shell covers outside the insulating block, the shielding shell has a first side wall and a second side wall provided oppositely along an arrangement direction of the first signal terminal and the second signal terminal, the first connecting portion has a first narrow edge and a second narrow edge, the second connecting portion has a third narrow edge and a fourth narrow edge, the first narrow edge and the third narrow edge are coupled to each other, and the second narrow edge and the fourth narrow edge respectively face toward the first side wall and the second side wall; a distance between the second narrow edge at the narrow portion and the first side wall is equal to a distance between the fourth narrow edge and the second side wall, and the first narrow edge and the second narrow edge at the widening portion protrude outward relatively than the first narrow edge and the second narrow edge at the narrow portion.

In certain embodiments, each of the at least one terminal assembly further comprises a shielding shell, the shielding shell covers outside the insulating block, and the exposing area and a side wall of the shielding shell face each other and are separated from each other by the air medium.

In certain embodiments, the insulating block comprises at least one first time insert-molding member and a second time insert-molding member, the first time insert-molding member fixes the first connecting portion and the second connecting portion, the first time insert-molding member has at least one mold positioning portion, the second time insert-molding member wraps outside the first connecting portion, the second connecting portion and the first time insert-molding member, and the first time insert-molding member wraps outside the narrow portion.

In certain embodiments, two mold positioning portions are formed by protruding outward from a same side of the first time insert-molding member, a filling slot is formed between the two mold positioning portions, and the filling slot is filled by the second time insert-molding member.

In certain embodiments, the first time insert-molding member is provided with at least one separation hole, portions of narrow edges of the first connecting portion and the second connecting portion being coupled to each other are exposed in the separation hole, and the separation hole is filled by the second time insert-molding member.

In certain embodiments, the first time insert-molding member further comprises at least two insert-molding blocks and at least one bridging portion, the bridging portion connects two adjacent ones of the insert-molding blocks, the bridging portion and the two adjacent ones of the insert-molding blocks collectively form two positioning recesses, the narrow edges at outer sides of the first connecting portion and the second connecting portion are respectively exposed in the two positioning recesses, and the separation hole is provided on the insert-molding blocks.

In certain embodiments, the second connecting portion has a constant width, and a width of the narrow portion is equal to a width of the second connecting portion.

Compared with the related art, the electrical connector according to certain embodiments of the present invention has the following beneficial effects.

The first connecting portion is exposed in the air medium through the exposing area, and compared to the second connecting portion being wrapped in the insulating block, the capacitance around the exposing area is reduced, which may shorten the signal transmission time of the first signal terminal, thus improving the time delay of the signal transmission between the first signal terminal and the second signal terminal with different lengths. Meanwhile, since the exposing area is exposed in the air medium, the impedance thereof is correspondingly increased. In the present invention, the exposing area is provided at the widening portion, which reduces the impedance by increasing the width thereof, thereby remedying the impedance being increased due to the exposing area being exposed in the air medium, facilitating improving time delay of the signal transmission, balancing the impedance characteristics of the first signal terminal, and reducing the sudden change of the impedance of the first signal terminal. Further, compared to the case where a snake bending shape is provided, in the present invention, the forming difficulties of the first signal terminal and the second signal terminal are lower, and there is a lesser effect to the signal coupling of the first signal terminal and the second signal terminal. If the second connecting portion also has an area being exposed in the air medium, it will cause the medium change around the second connecting portion, and there is a need to increase other design to balance the change to the electrical characteristics caused by the medium change around the second connecting portion, thus increasing the design difficulties of the electrical characteristics of the electrical connector; and the first connecting portion may need the exposing area with a larger area and the widening portion being wider to effectively shorten the time delay of the signal transmission, which may affect the retaining effect of the insulating block to the pair of the differential terminals and affect the overall size of the electrical connector. Thus, in the present invention, the second connecting portion is completely wrapped in the insulating block, which may reduce the design difficulties of the electrical characteristics of the electrical connector, and is conducive to the miniaturized design of the electrical connector.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
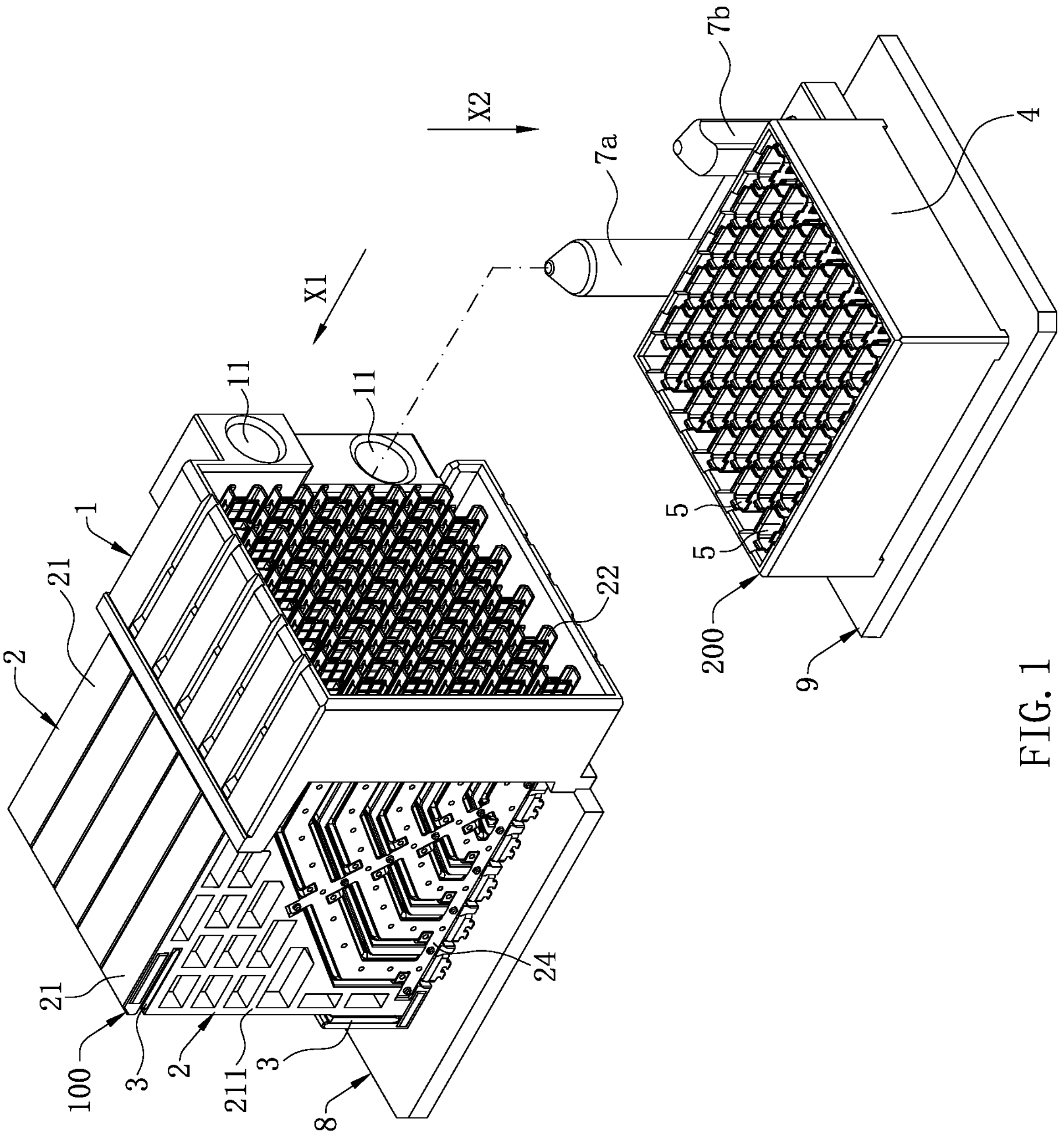
FIG. 1 is a perspective schematic view of an electrical connector system according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-13. In accordance with the purposes of this invention, as embodied and broadly described herein, this invention, in one aspect, relates to an electrical connector and a method of manufacturing the same.

FIG. 1 shows an electrical connector system according to certain embodiments of the present invention, which includes an electrical connector 100, a mating connector 200 mated with the electrical connector 100, a first electrical element electrically connected to the electrical connector 100 and a second electrical element electrically connected to the mating connector 200. In the present embodiment, the first electrical element is a first substrate 8, and the second electrical element is a second substrate 9. In other embodiments, the first electrical element and the second electrical element may be both cables, etc. Alternatively, the first electrical element may be the first substrate 8 and the second electrical element may be a cable. Further alternatively, the first electrical element may be a cable and the second electrical element may be the second substrate 9. The first electrical element and the second electrical element may further be other elements, as long as they may be electrically connected correspondingly to the electrical connector 100 or the mating connector 200 to transmit the corresponding signals, and are thus not limited thereto. A mating side of the electrical connector 100 is used to be mated with the mating connector 200, and a mounting side of the electrical connector 100 is used to be connected to the first electrical element. A mating side of the mating connector 200 is used to be mated with the electrical connector 100, and a mounting side of the mating connector 200 is used to be connected to the second electrical element.

Figure 2:
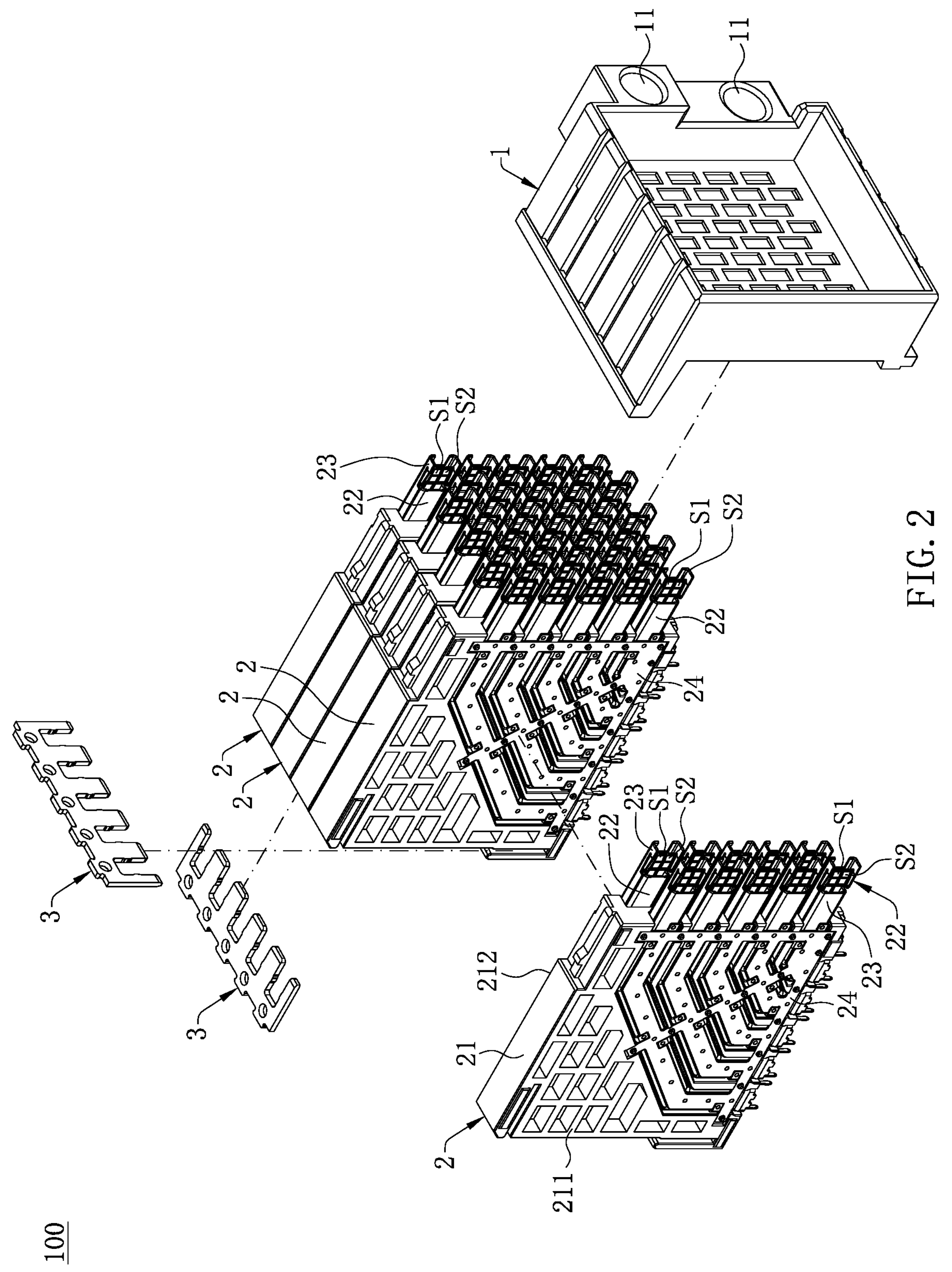
FIG. 2 is a perspective exploded view of an electrical connector according to certain embodiments of the present invention.
Figure 3:
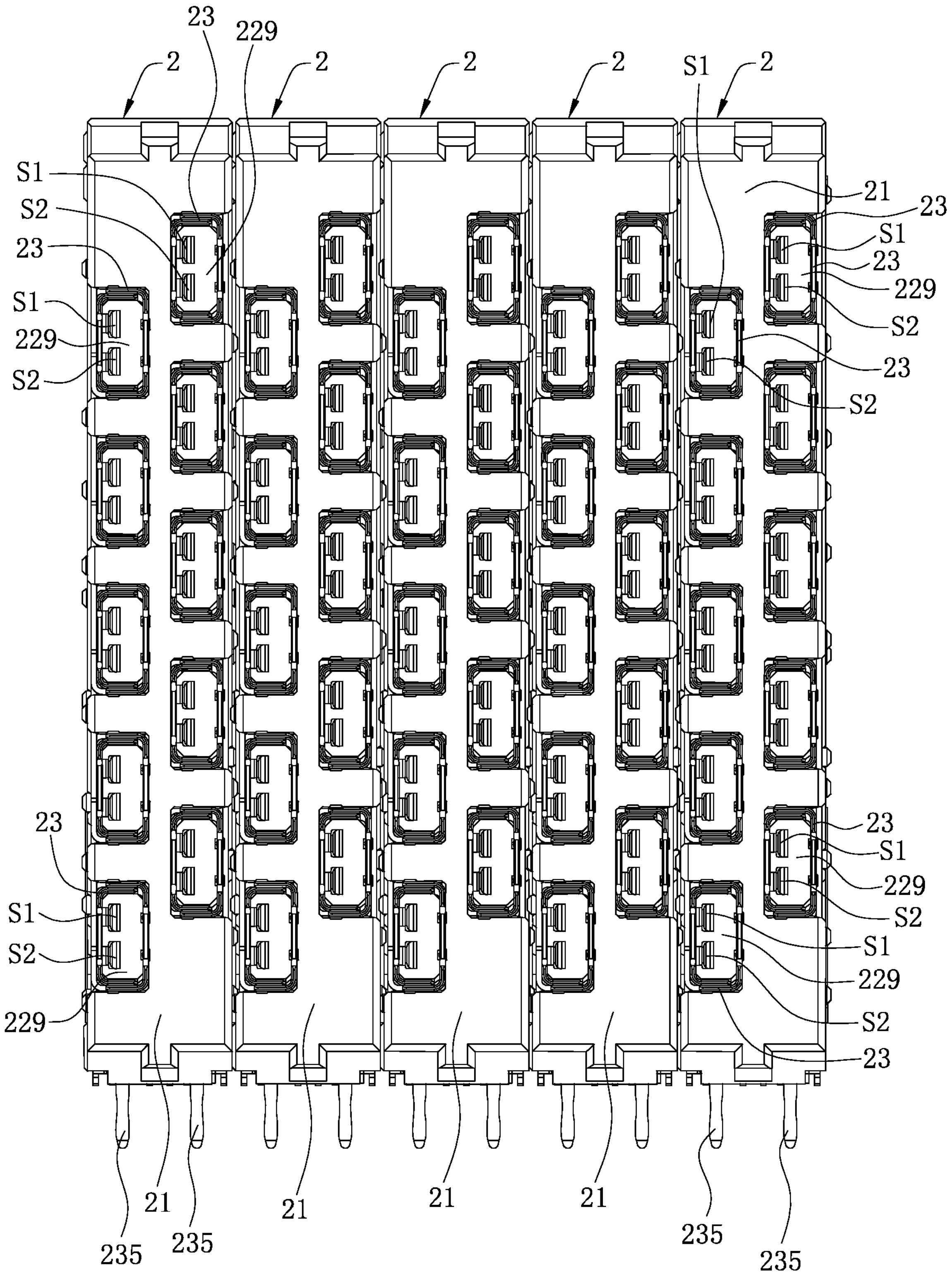
FIG. 3 is a plain view of the electrical connector viewing along a direction X1 and after removing the insulating shell according to certain embodiments of the present invention.
Figure 4:
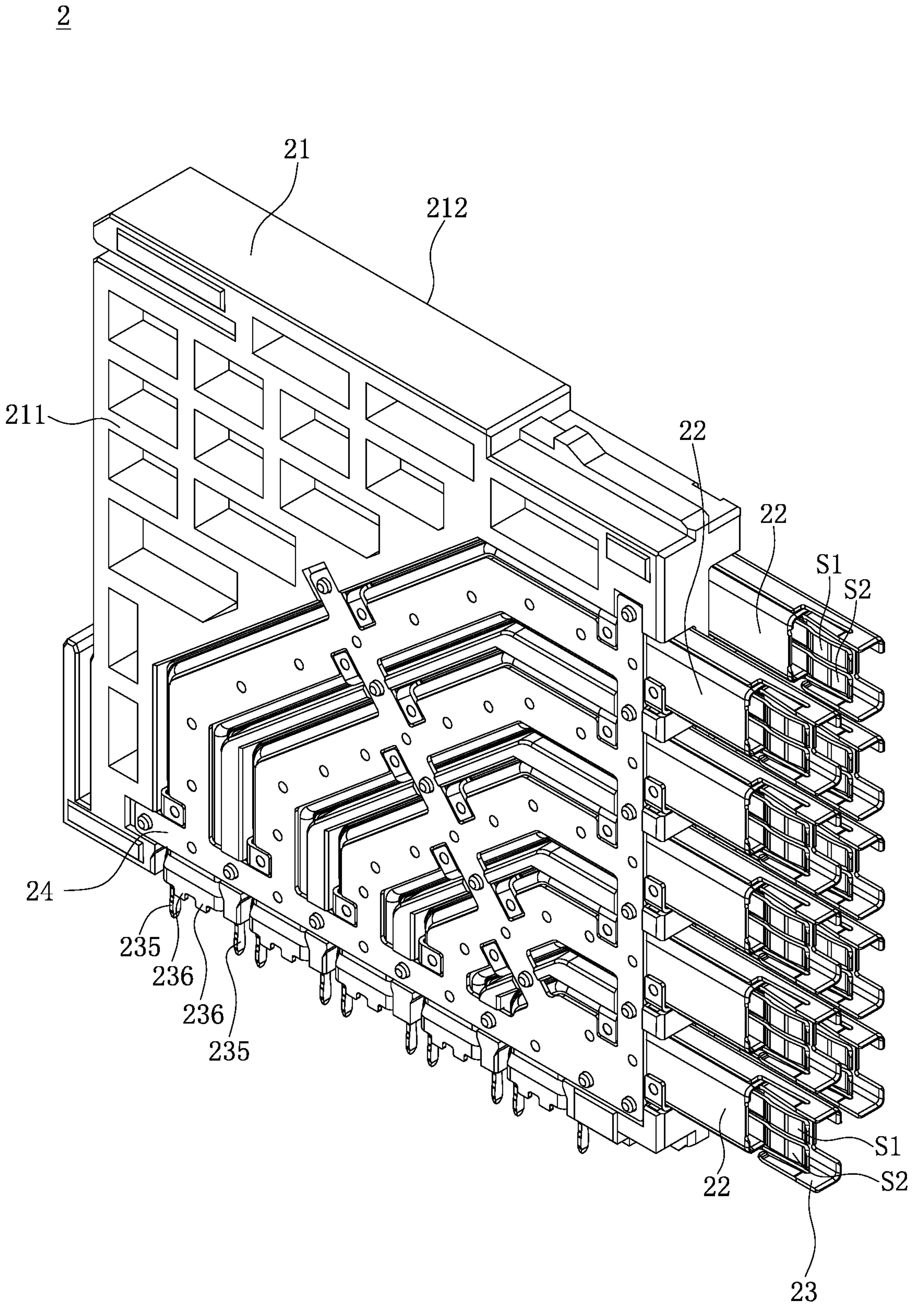
FIG. 4 is a perspective schematic view of an electrical module according to certain embodiments of the present invention.

FIG. 2 shows an electrical connector 100 according to certain embodiments of the present invention, which is used to be mated with the mating connector 200 and connected to the corresponding first electrical element. The electrical connector 100 includes an insulating shell 1, a plurality of electrical modules 2 and two retaining sheets 3. The insulating shell 1 further includes two guiding insertion holes 11. The electrical modules 2 are arranged in parallel and are partially fixed to the insulating shell 1, and the electrical modules 2 are further fixed and positioned to each other by the two retaining sheets 3.

Referring to FIG. 3 to FIG. 6, each electrical module 2 includes an insulating body 21, a plurality of terminal assemblies 22 and two grounding sheets 24. The insulating body 21 is provided with a first side surface 211 and a second side surface 212 opposite to each other. A plurality of accommodating slots 213 are respectively provided concavely on the first side surface 211 toward the second side surface 212 and concavely on the second side surface 212 toward the first side surface 211. Each accommodating slot 213 does not run through the first side surface 211 and the second side surface 212 along a concave direction thereof. Each accommodating slot 213 correspondingly accommodates one of the terminal assemblies 22. The terminal assemblies 22 are assembled and accommodated in the insulating body 21 respectively from two sides of the insulating body 21, such that one insulating body 21 may fix two rows of the terminal assemblies 22, and the two rows of the terminal assemblies 22 are limited and stopped by a stopping wall 214 at the middle of the insulating body 21. Compared to the case where each insulating body 21 only fixes one corresponding row of the terminal assemblies 22, in the present embodiment, the two rows of the terminal assemblies 22 may be stopped respectively by two sides of one stopping wall 214, instead of using two stopping walls 214 of two insulating bodies 21 to respectively stop the two rows of the terminal assemblies 22, so the present invention may reduce the thickness of one stopping wall 214, thereby reducing the production cost and effectively reducing the size of the electrical connector 100 in the arrangement direction of the terminal assemblies 22. Further, the two grounding sheets 24 are respectively fixed to the two sides of the insulating body 21 and are respectively in contact with the two rows of the terminal assemblies 22, which may prevent the terminal assemblies 22 from detaching out of the insulating body 21 from the accommodating slots 213 to a certain degree.

Each of the terminal assemblies 22 includes a first signal terminal S1 and a second signal terminal S2, an insulating block 227 and a shielding shell 23. The first signal terminal S1 and the second signal terminal S2 are arranged to form a pair of differential terminals and are narrow-edge coupled. A length of the first signal terminal S1 is greater than a length of the second signal terminal S2. The insulating block 277 fixes the first signal terminal S1 and the second signal terminal S2. The shielding shell 23 covers outside the insulating block 227, the first signal terminal S1 and the second signal terminal S2, thus shielding the interfering signals from the first signal terminal S1 and the second signal terminal S2, which is conducive to the signal transmission of the pair of the differential terminals. Each grounding sheet 24 is in contact with the shielding shells 23 of the terminal assemblies 22 in a same row, thus electrically connecting the shielding shells 23, and enhancing the grounding shielding effect of the shielding shells 23. In the present embodiment, the two rows of the differential terminals fixed by a same insulating body 21 are staggered in the row direction. That is, when viewing from the first side surface 211 of the insulating body 21 toward the second side surface 212, the projections of the two rows of the differential terminals do not overlap, thus reducing the signal interference between the two rows of the differential terminals.

The first signal terminal S1 has a first contact portion 221, a first conductive portion 223 and a first connecting portion 222 connecting the first contact portion 221 and the first conductive portion 223. The second signal terminal S2 has a second contact portion 224, a second conductive portion 226 and a second connecting portion 225 connecting the second contact portion 224 and the second conductive portion 226. The first contact portion 221 and the second contact portion 224 are both used to be mated with the mating connector 200, and the first conductive portion 223 and the second conductive portion 226 are both used to be electrically connected to the first electrical element. In the present embodiment, the first electrical element is a first substrate 8, and the first conductive portion 223 and the second conductive portion 226 are both surface solder type conductive portions, and are used to be soldered to the first substrate 8 by solder balls, thus enhancing the coplanarity of the first conductive portion 223 and the second conductive portion 226 in the electrical connector 100. In other embodiments, the first conductive portion 223 and the second conductive portion 226 may be fisheye shaped terminal portions (not shown) or insertion hole types conductive portions (not shown) to be inserted into the insertion holes (not shown) of the first substrate 8.

Figure 7:
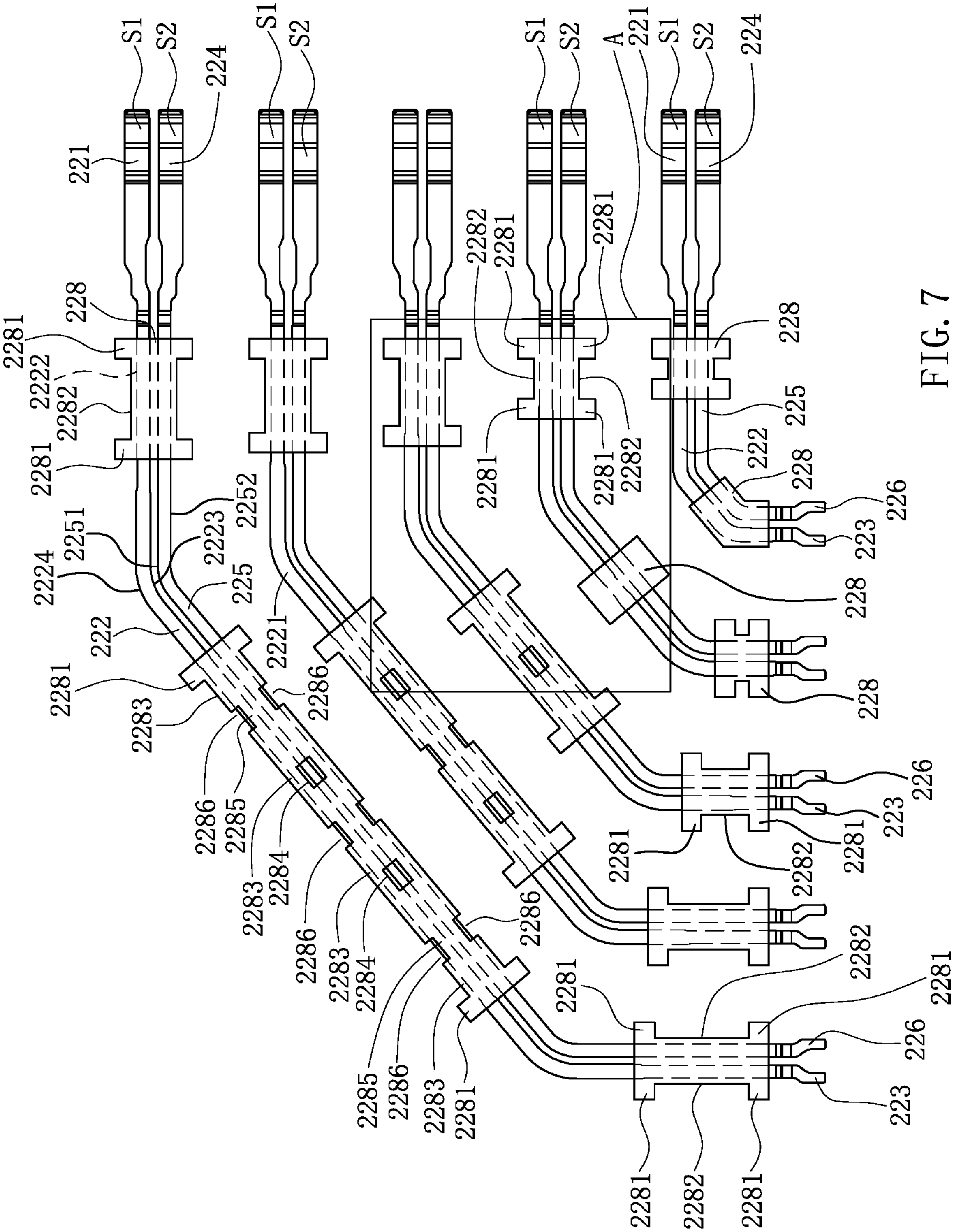
FIG. 7 is a side view of a row of differential terminals after being fixed by a first time insert-molding member according to certain embodiments of the present invention.
Figure 8:
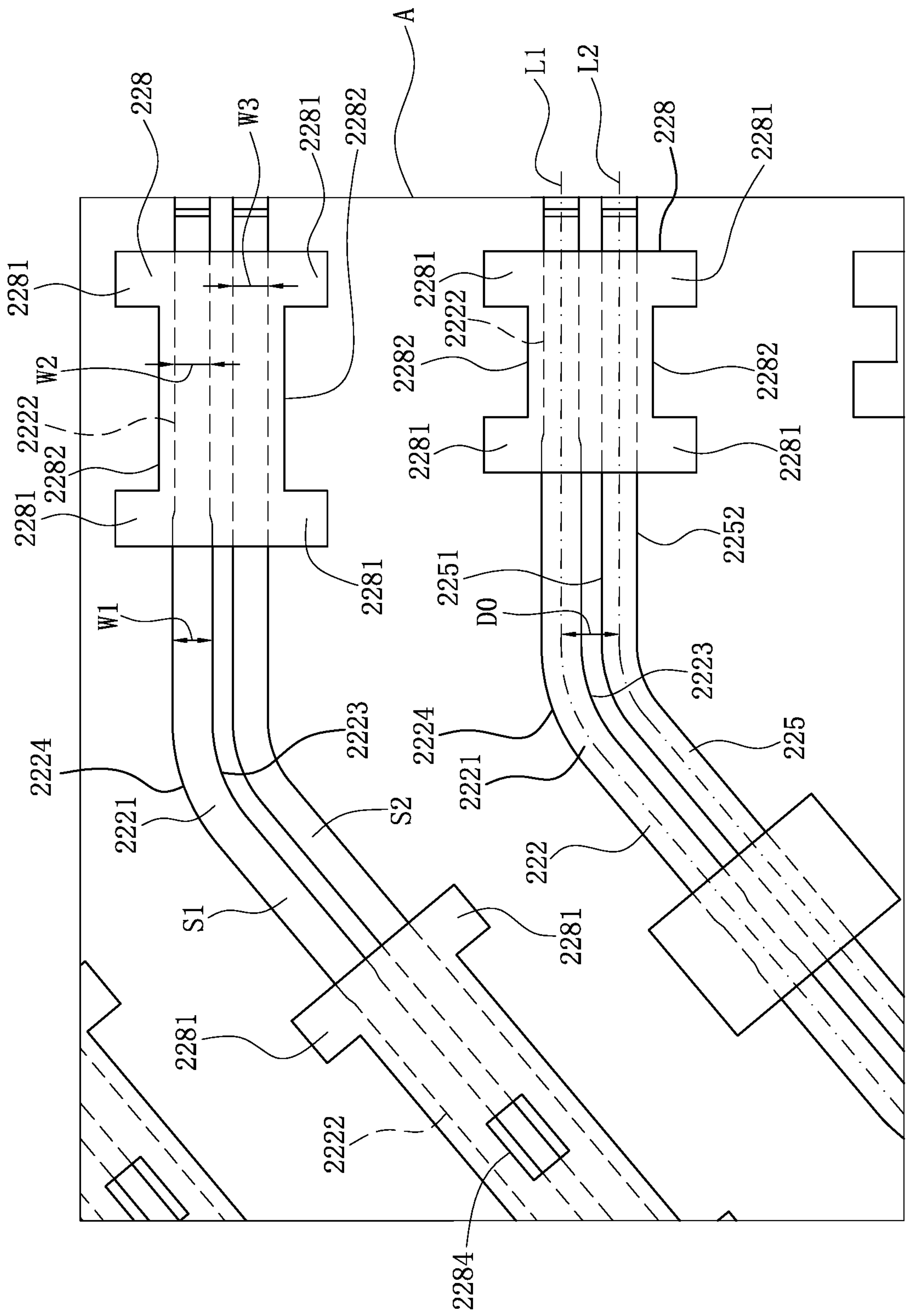
FIG. 8 is an enlarged view of a portion A in FIG. 7.

Referring to FIG. 7 to FIG. 11, the first connecting portion 222 is provided with at least one exposing area 22211. The exposing area 22211 is exposed in the insulating block 227 and exposed in the air medium. The first connecting portion 222 has at least one widening portion 2221 and at least one narrow portion 2222 connected to each other along a length direction thereof. A width of the widening portion 2221 is greater than a width of the narrow portion 2222. The exposing area 22211 is provided at the widening portion 2221, and the second connecting portion 225 is completely wrapped in the insulating block 227. As shown in FIG. 8, a first width W1 is the width of the widening portion 2221, a second width W2 is the width of the narrow portion 2222, and W1>W2. In the present invention, the first connecting portion 222 is exposed in the air medium through the exposing area 22211, and compared to the second connecting portion 225 being wrapped in the insulating block 227, the capacitance around the exposing area 22211 is reduced, which may shorten the signal transmission time of the first signal terminal S1, thus improving the time delay of the signal transmission between the first signal terminal S1 and the second signal terminal S2 with different lengths. Meanwhile, since the exposing area 22211 is exposed in the air medium, the impedance thereof is correspondingly increased. In the present invention, the exposing area 22211 is provided at the widening portion 2221, which reduces the impedance by increasing the width thereof, thereby remedying the impedance being increased due to the exposing area 22211 being exposed in the air medium, facilitating improving time delay of the signal transmission, balancing the impedance characteristics of the first signal terminal S1, and reducing the sudden change of the impedance of the first signal terminal S1. Further, compared to the case where a snake bending shape is provided, in the present invention, the forming difficulties of the first signal terminal S1 and the second signal terminal S2 are lower, and there is a lesser effect to the signal coupling of the first signal terminal S1 and the second signal terminal S2. It should be noted that, if the second connecting portion 225 also has an area being exposed in the air medium, it will cause the medium change around the second connecting portion 225, and there is a need to increase other design to balance the change to the electrical characteristics caused by the medium change around the second connecting portion 225, thus increasing the design difficulties of the electrical characteristics of the electrical connector 100; and the first connecting portion 222 may need the exposing area 22211 with a larger area and the widening portion 2221 being wider to effectively shorten the time delay of the signal transmission, which may affect the retaining effect of the insulating block 227 to the pair of the differential terminals and affect the overall size of the electrical connector 100. Thus, in the present invention, the second connecting portion 225 is completely wrapped in the insulating block 227, which may reduce the design difficulties of the electrical characteristics of the electrical connector 100, and is conducive to the miniaturized design of the electrical connector 100. In the present embodiment, the first connecting portions 222 of different ones of the first signal terminals S1 are provided with either one or two widening portions 2221. In other embodiments, there may be more than two widening portions 2221 in the first connecting portion 222, which may be provided according to the actual need. For the same reason, the quantity of the exposing area 22211 may be provided according to the actual need, and is thus not hereinafter limited thereto.

Referring to FIG. 7 to FIG. 11, the first connecting portion 222 and the second connecting portion 225 both bend and extend, and the exposing area 22211 is located at a bending location of the first connecting portion 222. At the bending location, the lengths of the first signal terminal S1 and the second signal terminal S2 may significantly change. In the present invention, the exposing area 22211 is provided at the bending location, thus directly adjusting the capacitance at the bending location, effectively hastening the signal transmission speed of the first signal terminal S1, and remedying the transmission time delay. In addition, since the bending shape is provided, the impedance at the bending location is greater than the impedance at other locations of the first connecting portion 222. Thus, the exposing area 22211 is provided at the widening portion 2221 and is located at the bending location, thus reducing the impedance at the bending location by increasing the width of the bending location, and further balancing the impedance of the first signal terminal S1. Further, the first connecting portion 222 has a first narrow edge 2223 and a second narrow edge 2224, and the second connecting portion 225 has a third narrow edge 2251 and a fourth narrow edge 2252. The first narrow edge 2223 and the third narrow edge 2251 are coupled to each other. The first narrow edge 2223 and the second narrow edge 2224 at the widening portion 2221 protrude outward relatively than the first narrow edge 2223 and the second narrow edge 2224 at the narrow portion 2222, and the first connecting portion 222 and the second connecting portion 225 are provided at an interval with a constant center distance DO. It should be noted that, a distance from a first center line L1 of the first connecting portion 222 to a second center line L2 of the second connecting portion 225 is the center distance DO between the first connecting portion 222 and the second connecting portion 225. Since the exposing area 22211 is provided at the bending location, when the center distance between the first connecting portion 222 and the second connecting portion 225 is greater, the length difference at the bending locations of the first connecting portion 222 and the second connecting portion 225 is greater. Compared to the case where the widening portion 2221 protrudes only at the first narrow edge 2223 or the second narrow edge 2224, in the prevent invention, the widening portion 2221 protrudes outward at both the first narrow edge 2223 and the second narrow edge 2224, which allows the center line of the widening portion 2221 to be more adjacent to the center line of the second connecting portion 225, thus reducing the length difference of the first connecting portion 222 and the second connecting portion 225, and reducing the time delay of the signal transmission between the first signal terminal S1 and the second signal terminal S2. Further, the center distance is constant, which is conducive to the characteristic impedance matching between the pair of the differential terminals, and is conducive to the signal coupling.

Figure 9:
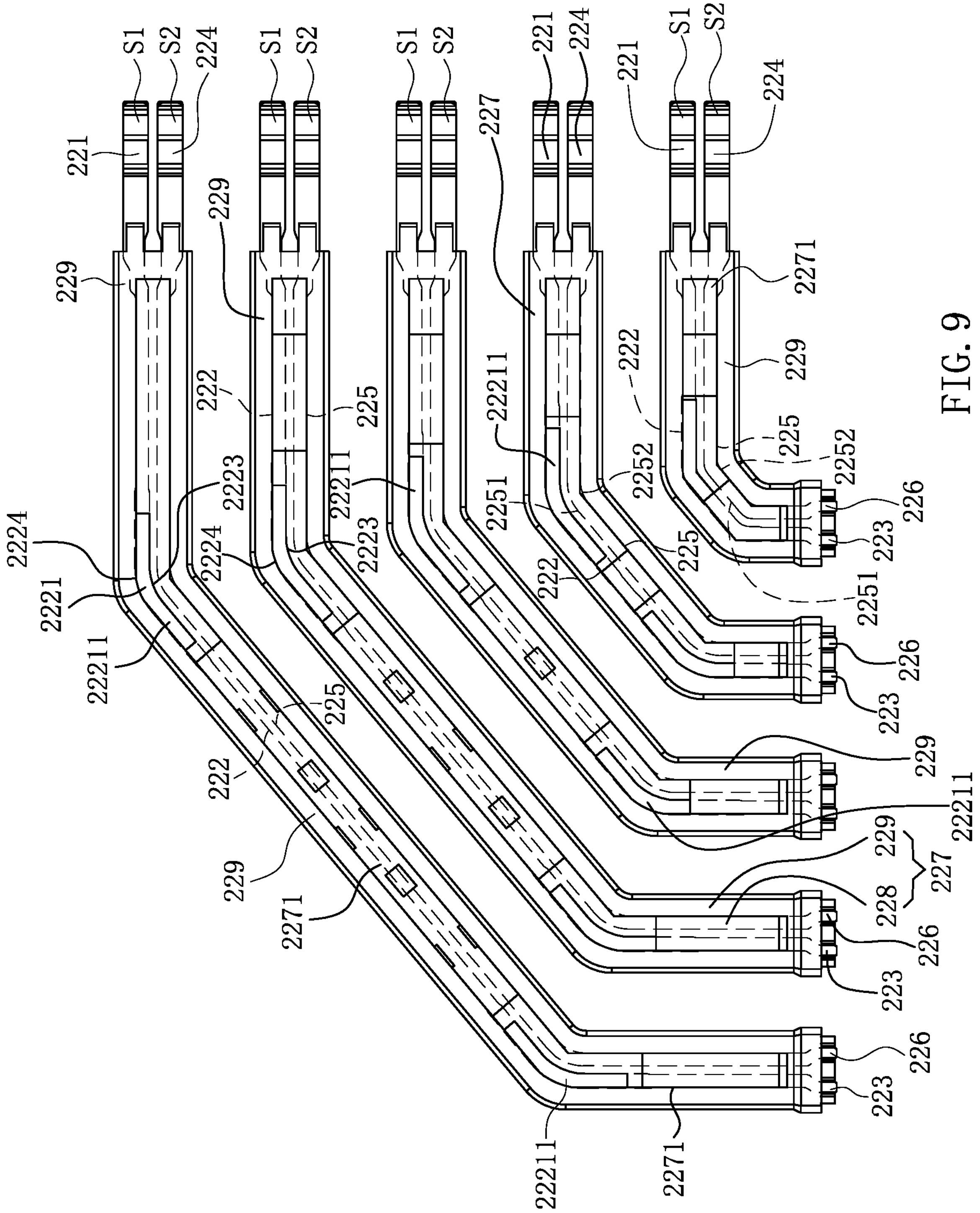
FIG. 9 is a side view of a row of terminal assemblies after removing the shielding shell according to certain embodiments of the present invention.
Figure 11:
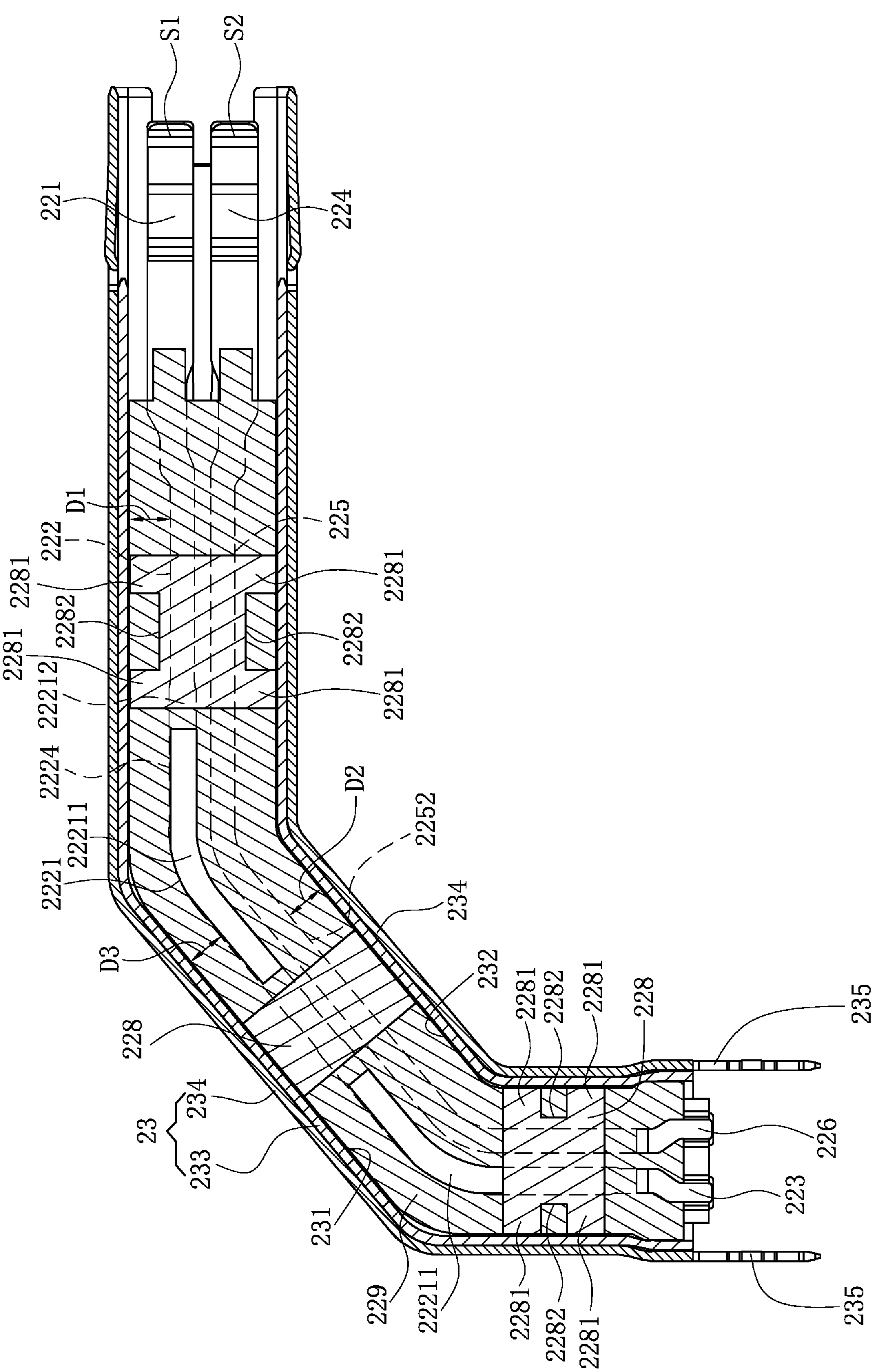
FIG. 11 is a sectional view of one of the terminal assemblies according to certain embodiments of the present invention.

Referring to FIG. 8, FIG. 9 and FIG. 11, the widening portion 2221 is further provided with at least one wrapping area 22212 being wrapped by the insulating block 227. The wrapping area 22212 is provided between the exposing area 22211 and the narrow portion 2222 along the extending direction of the first connecting portion 222. Compared to the case where the widening portion 2221 is only provided with the exposing area 22211, the width change location between the widening portion 2221 and the narrow portion 222 is the location where the medium around the first connecting portion 222 changes, such that there are simultaneous sudden changes to the capacitance and the impedance thereof, thus easily causing sudden change and distortion to the signals. In the present invention, the widening portion 2221 is further provided with the wrapping area 22212, such that when the signal is transmitted from the narrow portion 222 to the wrapping area 22212 and then to the exposing area 22211, there is the impedance change first, which then gradually transitions to the capacitance change, thus reducing the risk of sudden change and distortion to the signals caused by the simultaneous changes to the capacitance and the impedance thereof. In addition, the widening portion 2221 has a longer preserved length, which is convenient to sufficiently form the exposing area 22211, thus preventing from insufficient exposing area 22211 caused by errors in the manufacturing process. Meanwhile, the wrapping area 22212 is provided between the narrow portion 2222 and the exposing area 22211, thus allowing the insulating block 227 to wrap at the width change location of the first connecting portion 222, which is convenient for the forming of the insulating block 227. The second connecting portion 225 has a constant width, and the width of the narrow portion 2222 is equal to a width of the second connecting portion 225. Specifically, a third width W3 is defined as the width of the second connecting portion 225, and W2=W3. To enhance the electrical characteristics of the electrical connector 100, in addition to balancing the characteristics impedance at locations of the first signal terminal S1, there is a need to balance the characteristics impedance between the first signal terminal S1 and the second signal terminal S2. In the present embodiment, the width W2 of the narrow portion 2222 is equal to the width W3 of the second connecting portion 225, and the difference between the first connecting portion 222 and the second connecting portion 225 is provided at the widening portion 2221, thus reducing the difference between the pair of the differential terminals, and increasing the characteristics impedance matching of the pair of the differential terminals. Further, the width of the second connecting portion 225 is constant, thus reducing the parameter design for the first connecting portion 222 being performed according to the width change of the second connecting portion 225, and reducing the design difficulties of the pair of the differential terminals.

Figure 10:
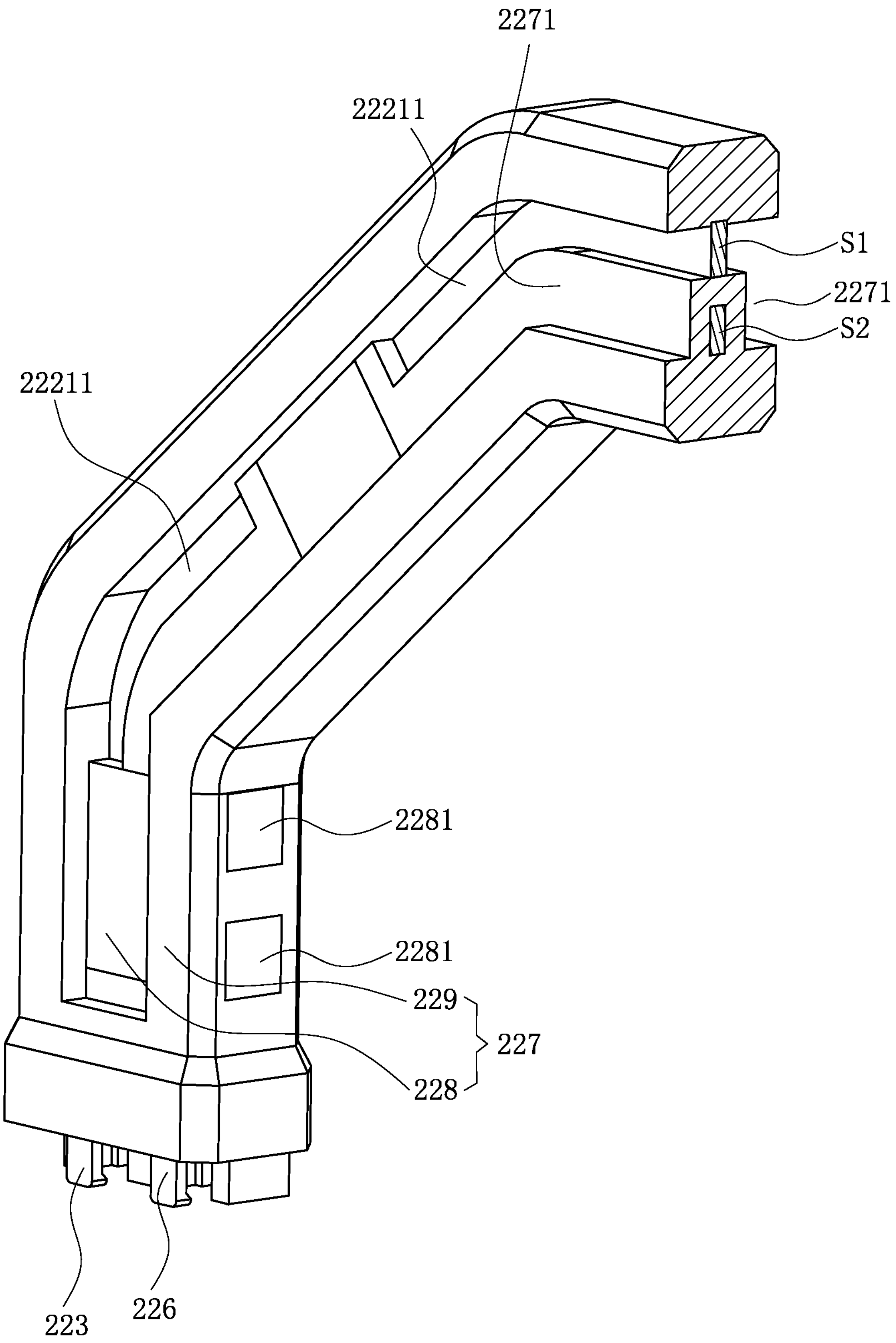
FIG. 10 is a partial perspective sectional view of one of the terminal assemblies after removing the shielding shell according to certain embodiments of the present invention.

Referring to FIG. 9 and FIG. 10, the insulating block 227 is provided with two grooves 2271. The two grooves 2271 are concavely provided respectively from two surfaces of the insulating block 227 toward the two wide edges of the first connecting portion 222 and the two wide edges of the second connecting portions 225, and each groove 2271 extends along the first connecting portion 222. By providing the grooves 2271, the volume of the insulating block 227 around the first connecting portion 222 and the second connecting portion 225 may be reduced. On the condition that the dielectric constant of the plastic material of the insulating block 227 is certain, the less volume of the insulating block 227 exists around the first connecting portion 222 and the second connecting portion 225, the more reducing of the capacitances of the first signal terminal S1 and the second signal terminal S2 may be achieved, thus reducing the insertion loss of the first signal terminal S1 and the second signal terminal S2. In other embodiments, the insulating block 227 may be concavely provided with one groove 2271 from only one of the surfaces toward one of the wide edges of the first connecting portion 222 and the second connecting portion 225, and the other surface is not concavely provided with the groove 2271. Alternatively, a plurality of grooves 2271 may be concavely provided at intervals from one of the surfaces of the insulating block 227. In the present embodiment, the insulating block 227 is provided with the two grooves 2271 concavely provided respectively from two surfaces of the insulating block toward the two wide edges of the first connecting portion 222 and the second connecting portions 225, thus reducing the volume of the insulating materials around the two wide edges of the first connecting portion 222 and the second connecting portions 225, allowing the capacitances of the two wide edges of the first connecting portion 222 to be relatively equivalent, and allowing the capacitances of the two wide edges of the second connecting portions 225 to be relatively equivalent.

Referring to FIG. 6 to FIG. 9, the insulating block 227 includes a plurality of first time insert-molding members 228 and a second time insert-molding member 229. The first time insert-molding members 228 fix the first connecting portion 222 and the second connecting portion 225. Each first time insert-molding member 228 has a plurality of mold positioning portions 2281. The second time insert-molding member 229 wraps outside the first connecting portion 222, the second connecting portion 225 and the first time insert-molding members 228, and the first time insert-molding members 228 wrap outside the narrow portion 2222. It should be noted that, the mold positioning portions 2281 are used for the mold to fix the first time insert-molding members 228 and the pair of the differential terminals when insert-molding the second time insert-molding member 229, in order to continuously wrap and form the second time insert-molding member 229 outside the pair of the differential terminals and the first time insert-molding members 228. It should be noted that, if the insulating block 227 is insert-molded only once, when insert-molding the insulating block 227, the mold will be directly fixed on the differential terminals to perform insert-molding of the insulating block 227, and after the forming of the insulating block 227 is complete, and after the mold is removed, notches will be formed on fixing locations of the differential terminals, such that the terminals are partially exposed in the air, without wrapping the second connecting portion 225 completely in the insulating block 227, thus affecting the characteristics impedance of the second connecting portion 225. In the present embodiment, the insulating block 227 includes the first time insert-molding members 228 and the second time insert-molding member 229, and each first time insert-molding member 228 has the mold positioning portions 2281, thus effectively wrapping the second connecting portion 225 completely in the insulating block 227. The narrow portion 2222 reserves and provides a forming space for the first time insert-molding members 228 in the width thereof, which is conducive to the first time insert-molding members 228 to wrap and fix the first connecting portion 222 and the second connecting portion 225 in the limited space. It should be noted that, in the present embodiment, the surfaces of the mold positioning portions 2281 are in contact with the mold, and after the mold is removed, the surfaces of the mold positioning portions 2281 being in contact with the mold are exposed out of the second time insert-molding member 229. Further, two mold positioning portions 2281 are formed by protruding outward from a same side of each first time insert-molding member 228, and a filling slot 2282 is formed between the two mold positioning portions 2281. The filling slot 2282 is filled by the second time insert-molding member 229. Thus, materials of the first time insert-molding members 228 and the second time insert-molding member 229 are provided to engage with each other, thus increasing the structural stability between the first time insert-molding members 228 and the second time insert-molding member 229, and preventing the first time insert-molding members 228 and the second time insert-molding member 229 from moving and loosening relative to each other. In the present embodiment, the mold positioning portions 2281 are provided at the two ends of the length direction thereof. Further, one of the first time insert-molding members 228 is provided with at least one separation hole 2284. Portions of narrow edges of the first connecting portion 222 and the second connecting portion 225 being coupled to each other are exposed in the separation hole 2284, and the separation hole 2284 is filled by the second time insert-molding member 229. Specifically, a portion of the first narrow edge 2223 of the first connecting portion 222 and a portion of the third narrow edge 2251 of the second connecting portion 225 are exposed in the separation hole 2284 and are wrapped by the second time insert-molding member 229. Thus, the separation hole 2284 provides a fixing location for the mold, which may separate the first signal terminal S1 and the second signal terminal S2 for the mold when insert-molding the first time insert-molding members 228, thus preventing from an excessive insert-molding pressure that presses the first signal terminal S1 and the second signal terminal S2 to deform and be in contact altogether. It should be noted that, the quantity of the first time insert-molding members 228 included in one insulating block 228 and the length of each first time insert-molding member 228 may be provided correspondingly based on the lengths of the first signal terminal S1 and the second signal terminal S2. It should be noted that, the second time insert-molding member 229 may expose a portion of the first time insert-molding members 228. For example, as shown in the drawings of the present embodiment, after the second time insert-molding member 229 is formed outside the first time insert-molding members 228, a portion of the surfaces of the first time insert-molding members 228 are exposed out of the groove 2271. That is, the bottom surface of the groove 2271 is flush with the surfaces of the first time insert-molding members 228. In other embodiments, it is possible that the surfaces of the first time insert-molding members 228 are not exposed out of the groove 2271.

Figure 6:
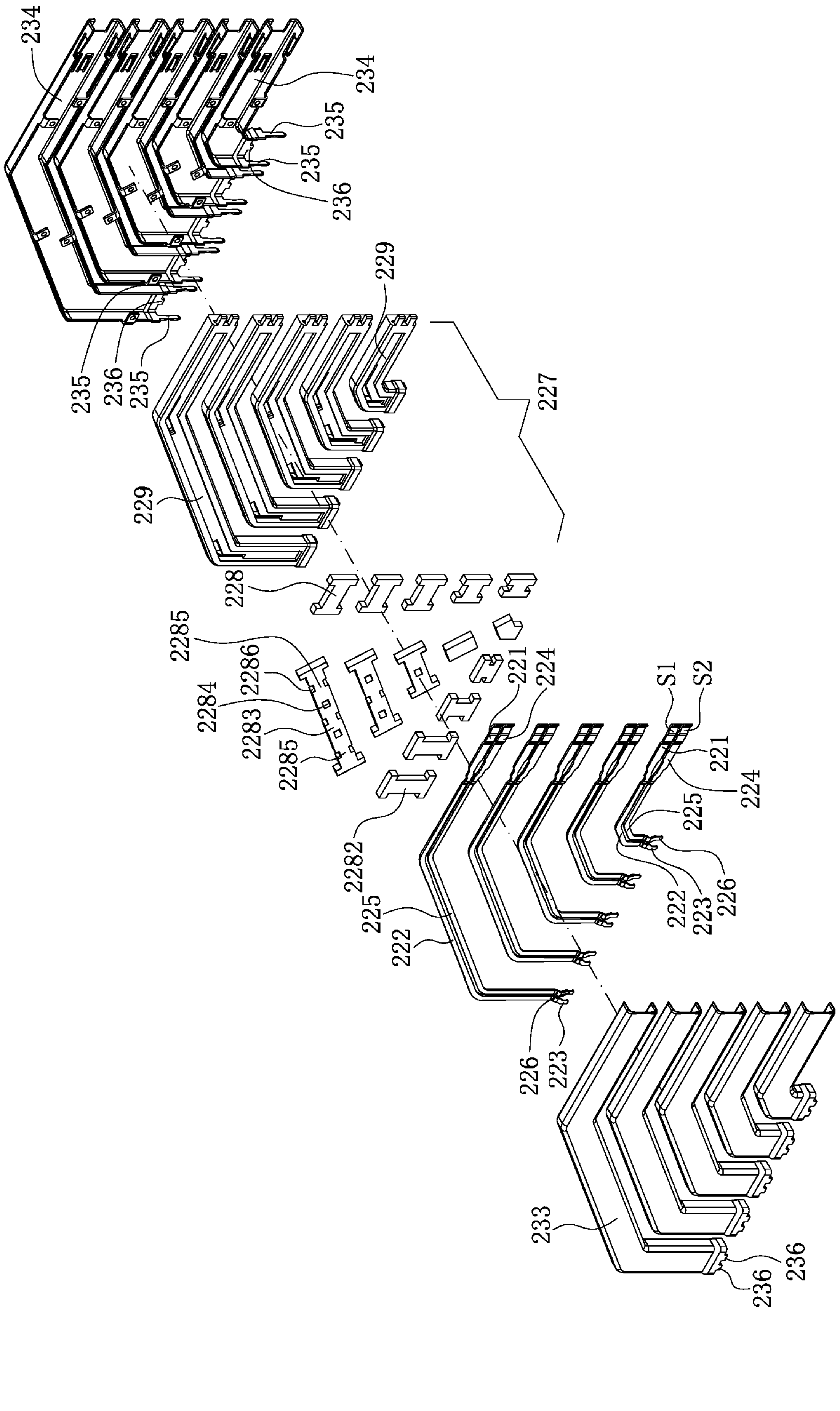
FIG. 6 is a perspective exploded view of a row of terminal assemblies according to certain embodiments of the present invention.

Referring to FIG. 6 and FIG. 7, at least one of the first time insert-molding member 228 further includes at least two insert-molding blocks 2283 and at least one bridging portion 2285. The bridging portion 2285 connects two adjacent ones of the insert-molding blocks 2283. The bridging portion 2285 and the two adjacent insert-molding blocks 2283 collectively form two positioning recesses 2286. The narrow edges at outer sides of the first connecting portion 222 and the second connecting portion 225 are respectively exposed in the positioning recesses 2286, and the separation hole 2284 is provided on the insert-molding blocks 2283. Specifically, a portion of the second narrow edge 2224 of the first connecting portion 222 and a portion of the fourth narrow edge 2252 of the second connecting portion 225 are respectively exposed in the corresponding positioning recesses 2286. Thus, the mold may be positioned at outer sides and inner sides of the first signal terminal S1 and the second signal terminal S2 by the separation hole 2284 and the positioning recesses 2286, which is convenient for forming the first time insert-molding members 228 on the first signal terminal S1 and the second signal terminal S2. Meanwhile, the separation hole 2284 and the positioning recesses 2286 may be staggered relatively in the extending direction of the first connecting portion 222 and the second connecting portion 225, which is convenient for performing positioning and insert-molding at different portions of the first connecting portion 222 and the second connecting portion 225. As shown in FIG. 7, each terminal assembly 22 is provided with a plurality of first time insert-molding members 228. For the first time insert-molding members 228, there is at least one first time insert-molding member 228 that includes a plurality of insert-molding blocks 2283, and there is at least one other first time insert-molding member 228 that includes only one insert-molding block 2283. Meanwhile, at least one of the insert-molding blocks 2283 may be provided with the separation hole 2284 thereon, and at least one other insert-molding block 2283 may be provided with no separation hole 2284 thereon. In other words, the present invention does not require all of the insert-molding blocks 2283 to be provided with separation holes 2284 thereon. Further, in other embodiments, it is possible that one insert-molding block 2283 may be provided with multiple separation holes 2284 thereon.

Figure 5:
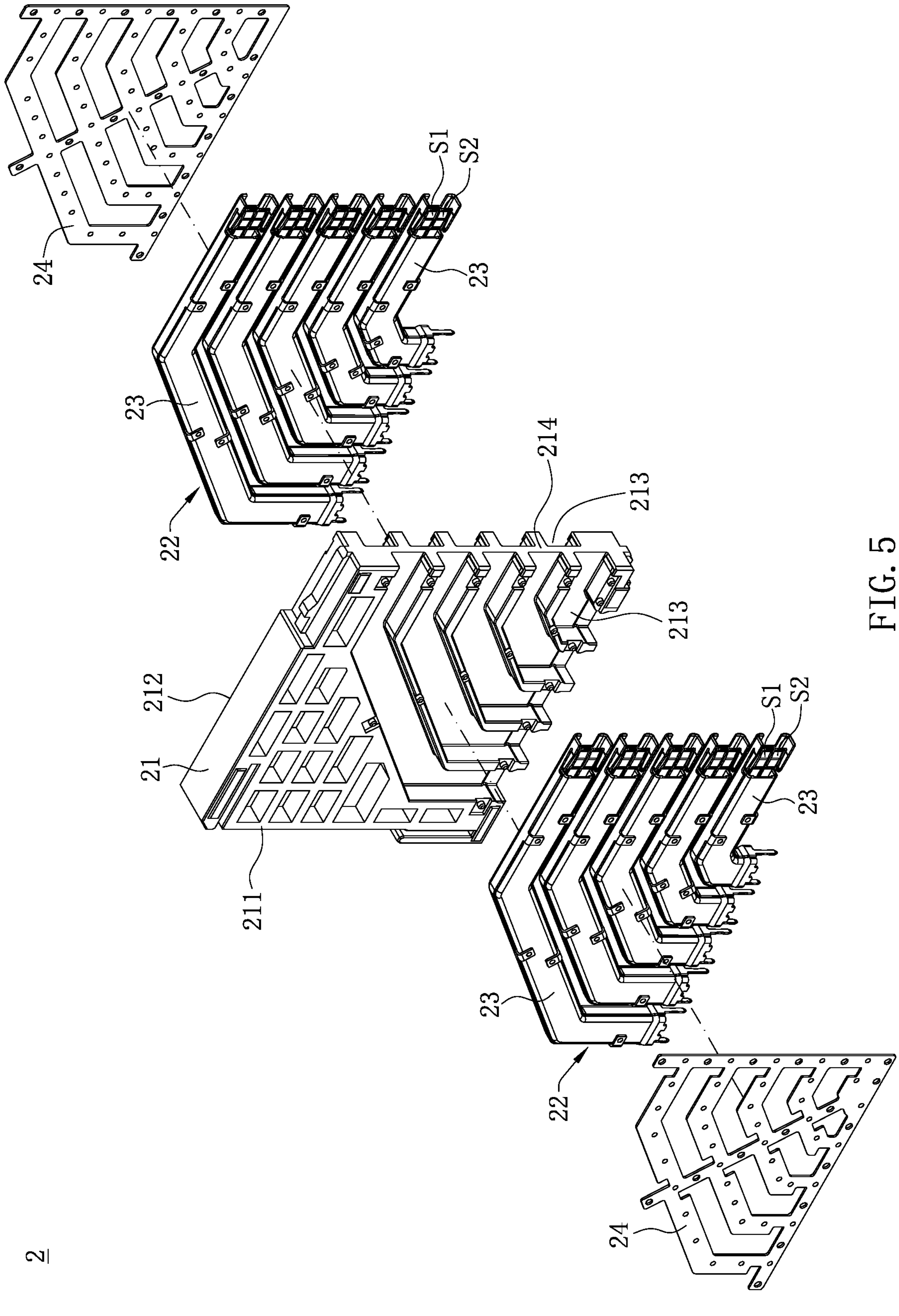
FIG. 5 is a perspective exploded view of an electrical module according to certain embodiments of the present invention.

Referring to FIG. 5 and FIG. 11, the shielding shell 23 covers outside the insulating block 227. The shielding shell 23 has a first side wall 231 and a second side wall 232 provided oppositely along an arrangement direction of the first signal terminal S1 and the second signal terminal S2. The first narrow edge 2223 of the first connecting portion 222 and the third narrow edge 2251 of the second connecting portion 225 are coupled to each other, and the second narrow edge 2224 of the first connecting portion 222 and the fourth narrow edge 2252 of the second connecting portion 225 respectively face toward the first side wall 231 and the second side wall 232. A distance between the second narrow edge 2224 at the narrow portion 2222 and the first side wall 231 is defined as a first distance D1. A distance between the fourth narrow edge 2252 and the second side wall 232 is defined as a second distance D2. A distance between the second narrow edge 2224 at the widening portion 2221 and the first side wall 231 is defined as a third distance D3. The first distance D1 is equal to the second distance D2. The first narrow edge 2223 and the second narrow edge 2224 at the widening portion 2221 protrude outward relatively than the first narrow edge 2223 and the second narrow edge 2224 at the narrow portion 2222. Compared to the case where the widening portion 2221 only protrudes outward at the first narrow edge 2223 or the second narrow edge 2224, the present invention may reduce the protruding amount of the second narrow edge 2224 at the widening portion 2221, and reduce the distance change between the second narrow edge 2224 and the first side wall 231. That is, the difference between the first distance D1 and the third distance D3 is reduced, thus further reducing the impedance fluctuation of the first connecting portion 222. Meanwhile, the difference between the second distance D2 and the third distance D3 is reduced, such that the characteristics impedance matching of the first signal terminal S1 and the second signal terminal S2 is increased. Further, if the protruding amount of the second narrow edge 2224 is large, it will cause the shielding shell 23 to be adaptively enlarged to avoid from being in contact with the first connecting portion 222. Thus, in the present invention, the widening portion 2221 is further conducive to reducing the size of the shielding shell 23, and conducive to reducing the volume of the electrical connector 100. Further, the exposing area 22211 and a side wall of the shielding shell 23 face each other and are separated by the air medium, thus further adjusting the capacitance of the exposing area 22211 and adjusting the impedance of the exposing area 22211, further adjusting the signal transmission time and characteristics impedance of the first signal terminal S1, and improving the signal transmission characteristics of the electrical connector 100. It should be noted that, as shown in FIG. 5 and FIG. 6, the shielding shell 23 provided in the present embodiment includes a first shielding body 233 and a second shielding body 234 in contact with each other, and the first shielding body 233 and the second shielding body 234 are assembled to each other to form the shielding shell 23 covering outside surrounding the insulating block 227. In other embodiments, the shielding shell 23 may be an integrally-formed structure, or may be formed by assembly the first shielding body 233 and the second shielding body 234 in other shapes. In addition, the shielding shell 23 is provided with two insertion hole type soldering legs 235 provided oppositely and two sets of surface soldering type soldering legs 236 provided oppositely. Each set of the surface soldering type soldering legs 236 includes two surface soldering type soldering legs. Thus, the two insertion hole type soldering legs 235 of the shielding shell 23 may increase the connecting stability between the terminal assemblies 22 and the first substrate 8, and the surface soldering type soldering legs 236 of the shielding shell 23 may provide a reserved space for the signal transmission inside the first substrate 8, which is convenient for the circuit arrangement design of the first substrate 8, and may be supported on the surface of the first substrate 8 to provide more supporting force for the terminal assemblies 22. In the present embodiment, the two sets of the surface soldering type soldering legs 236 are respectively provided on the first shielding body 233 and the second shielding body 234.

Figure 12:
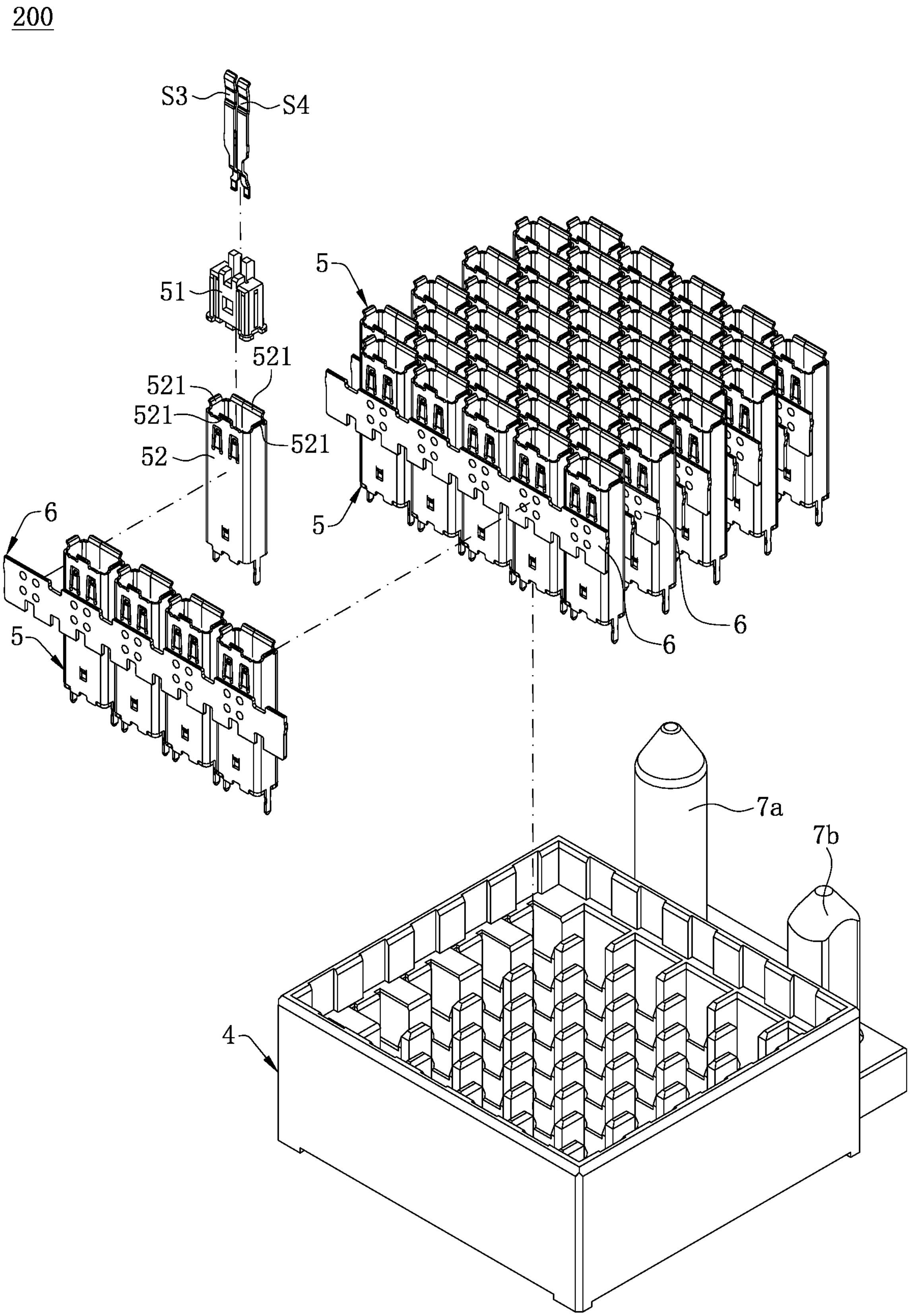
FIG. 12 is a perspective exploded view of a mating connector according to certain embodiments of the present invention.
Figure 13:
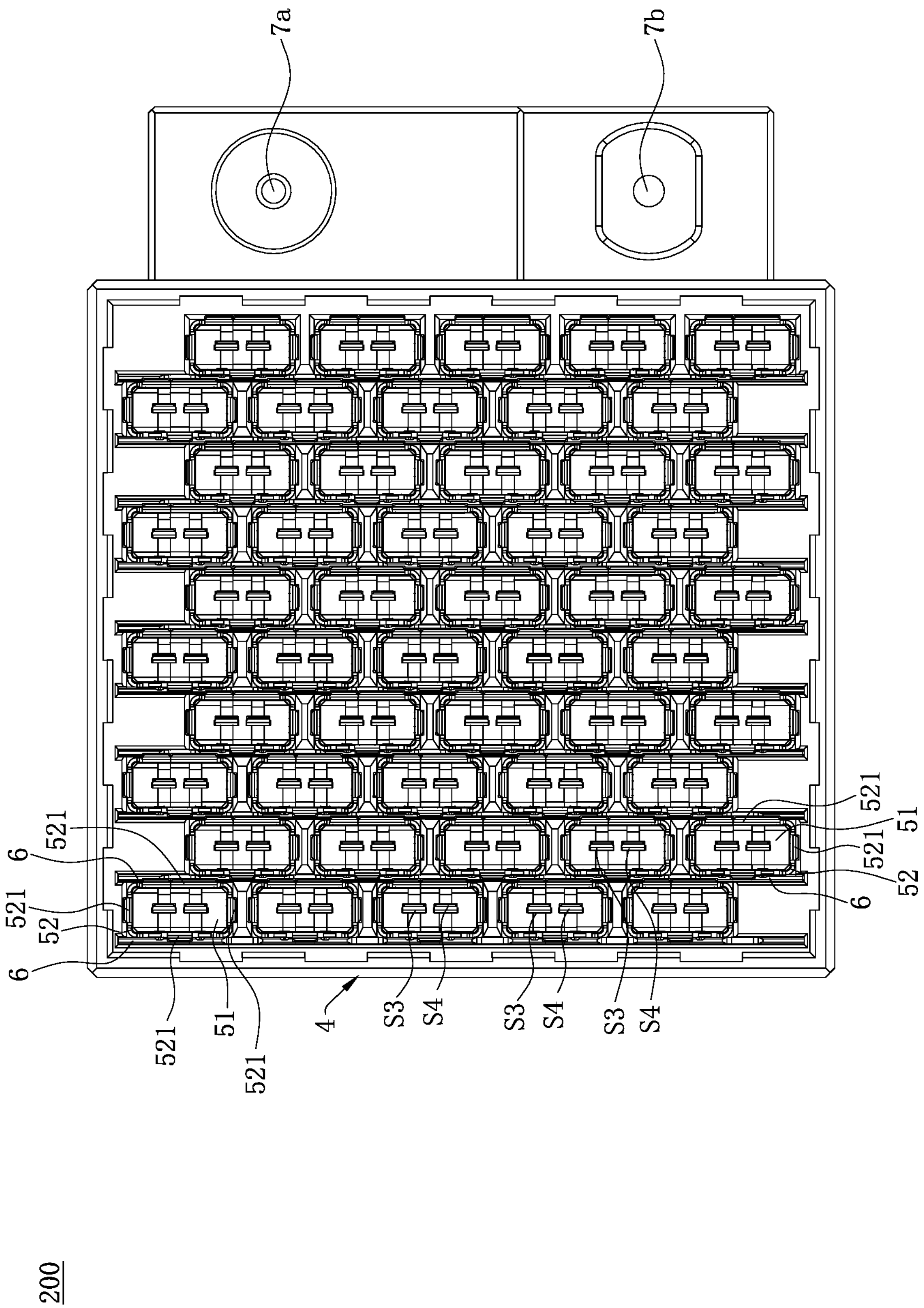
FIG. 13 is a plain view of the mating connector viewing along a direction X2 according to certain embodiments of the present invention.

Referring to FIG. 1, FIG. 12 and FIG. 13, the mating connector 200 includes an insulating seat 4, a plurality of mating assemblies 5, a plurality of conductive members 6 and two guiding posts. The mating assemblies 5 are fixed to the insulating seat 4 and are arranged in a plurality of rows, and each row of the mating assemblies 5 are in contact with a corresponding one of the conductive members 6 altogether. The two guiding posts are fixed in the insulating seat 4, and each guiding post is used to be inserted into a corresponding one of the guiding insertion holes 11. When mating of the electrical connector 100 and the mating connector 200 is complete, the insulating seat 4 and the insulating shell 1 are mated, each mating assembly 5 and a corresponding terminal assembly 22 are mated, and the two guiding posts are respectively inserted and fixed in the two guiding insertion holes 11.

Specifically, the two guiding posts include a first guiding post 7*a* and a second guiding post 7*b*, and a length of the first guiding post 7*a* is greater than a length of the second guiding post 7*b*. In the mating process of the electrical connector 100 and the mating connector 200, the first guiding post 7*a* is firstly matched with its corresponding guiding insertion hole 11 to perform initial guiding positioning, and then the second guiding post 7*b* is then matched with its corresponding guiding insertion hole 11 to perform accurate positioning. Since the first guiding post 7*a* is for performing the initial positioning for the electrical connector 100 and the mating connector 200, there is a greater damaging risk for the first guiding post 7*a*, such as being broken or deforming. The second guiding post 7*b* is for performing further positioning on the premise that the first guiding post 7*a* has performed the initial positioning, and the second guiding post 7*b* has a lower damaging risk relative to that of the first guiding post 7*a*. Thus, in the present embodiment, the material strength of the first guiding post 7*a* is greater than the material strength of the second guiding post 7*b*. For example, the first guiding post 7*a* is formed by a metal material, and the second guiding post 7*b* is formed by a plastic material. Thus, the production cost of the second guiding post 7*b* may be further reduced on the premise that the two guiding posts are ensured not to be easily damaged.

Referring to FIG. 12 and FIG. 13, each mating assembly 5 includes an insulating fixing member 51, a third signal terminal S3 and a fourth signal terminal S4 fixed to the insulating fixing member 51, and a mating shielding body 52. The third signal terminal S3 and the fourth signal terminal S4 are arranged to form a pair of differential terminals and are narrow-edge coupled. The mating shielding body 52 wraps outside the insulating fixing member 51, the third signal terminal S3 and the fourth signal terminal S4. As shown in FIG. 13, corresponding to the electrical connector 100, the mating assemblies 5 of the mating connector 200 are also correspondingly arranged to form a plurality of rows, and the mating shielding bodies 52 of each row of the mating assemblies 5 are in contact with a corresponding one of the conductive members 6. The two adjacent rows of the differential terminals are staggered in the row direction, thus reducing the signal interference between the two adjacent rows of the differential terminals. In the present embodiment, when mating of the electrical connector 100 and the mating connector 200 is complete, the first signal terminal S1 and the second signal terminal S2 are respectively mated with the third signal terminal S3 and the fourth signal terminal S4, the shielding shell 23 is mated with the mating shielding body 52, and the shielding shell 23 is accommodated in the mating shielding body 52. A guiding portion 521 is provided to flip outward at the mating edge of the mating shielding body 52 to guide the shielding shell 23 into the mating shielding body 52. In other embodiments, it is possible that the mating shielding body 52 is accommodated in the shielding shell 23.

It should be noted that, when the electrical connector 100 is provided with power transmission elements (not shown, same below) used for transmitting power signals, the power transmission elements may be provided at an outer side of the matrix arranged by the terminal assemblies 22. For example, the power transmission elements may be provided side-by-side at two sides of one side of the electrical connector 100. It is also possible to provide the power transmission elements in the matrix. For example, the power transmission elements may be provided in the form of the electrical modules 2 according to the present invention, and the power transmission elements and the electrical modules 2 are arranged side-by-side along the thickness direction of the insulating body 21 according to a certain arrangement sequence. In an alternative example, each electrical module 2 is provided with a plurality of terminal assemblies 22, in which some of the terminal assemblies 22 include the pair of differential terminals used to transmit the differential signal data, and some other terminal assemblies 22 include power terminals, and the power terminals may be used as the power transmission elements. For example, each row of the terminal assemblies 22 of each electrical module 2 has the terminal assemblies 22 for transmitting the differential signal data, and also has the terminal assemblies 22 for transmitting the power signals. Thus, the present invention merely limits the electrical connector 100 to have at least one terminal assembly 22 that includes the first signal terminal S1 and the second signal terminal S2 used for transmitting the differential signal data, without limiting all of the terminal assemblies 22 of the electrical connector 100 to be used for transmitting the differential signal data. The present invention may further configure the signals being transmitted by the terminals of the terminal assemblies 22 according to the actual need, without being hereinafter limited thereto.

In sum, the electrical connector 100 according to certain embodiments of the present invention has the following beneficial effects:

1. The capacitance value around the first connecting portion 222 is reduced by the exposing area 22211, which shortens the signal transmission time of the longer first signal terminal S1, thereby improving the time delay of the signal transmission between the first signal terminal S1 and the second signal terminal S2 with different lengths. Further, the exposing area 22211 is provided at the widening portion 2221, which reduces the impedance by increasing the width thereof, thereby remedying the impedance being increased due to the exposing area 22211 being exposed in the air medium, facilitating improving time delay of the signal transmission, balancing the impedance characteristics of the first signal terminal S1, and causing a lesser effect to the forming difficulties and the signal coupling of the first signal terminal S1 and the second signal terminal S2.

2. The exposing area 22211 is provided at the bending location of the first connecting portion 222, thus effectively hastening the signal transmission speed of the first signal terminal S1, remedying the transmission time delay, reducing the impedance at the bending location by increasing the width of the bending location, and further balancing the impedance of the first signal terminal S1.

3. The first narrow edge 2223 and the second narrow edge 2224 at the widening portion 2221 protrude outward relatively than the first narrow edge 2223 and the second narrow edge 2224 at the narrow portion 2222, and the first connecting portion 222 and the second connecting portion 225 are provided at an interval with a constant center distance, which allows the center line of the widening portion 2221 to be more adjacent to the center line of the second connecting portion 225, thus reducing the length difference of the first connecting portion 222 and the second connecting portion 225, and reducing the time delay of the signal transmission between the first signal terminal S1 and the second signal terminal S2. Further, the center distance is constant, which is conducive to the characteristic impedance matching between the pair of the differential terminals, and is conducive to the signal coupling.

4. By providing the grooves 2271, the insertion loss of the first signal terminal S1 and the second signal terminal S2 may be reduced.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector, configured to mate with a mating connector, the electrical connector comprising:

at least one terminal assembly, wherein each of the at least one terminal assembly comprises:

a first signal terminal and a second signal terminal, arranged to form a pair of differential terminals and narrow-edge coupled to each other, wherein the first signal terminal has a first contact portion, a first conductive portion and a first connecting portion connecting the first contact portion and the first conductive portion, the second signal terminal has a second contact portion, a second conductive portion and a second connecting portion connecting the second contact portion and the second conductive portion, the first contact portion and the second contact portion are both configured to be in contact with the mating connector, the first conductive portion and the second conductive portion are both configured to be electrically connected to a corresponding electrical component, and a length of the first signal terminal is greater than a length of the second signal terminal; and an insulating block, fixing the first signal terminal and the second signal terminal;

wherein the first connecting portion is provided with at least one exposing area, the exposing area is exposed to the insulating block and exposed in air medium, the first connecting portion has at least one widening portion and at least one narrow portion connected to each other along a length direction thereof, a width of the widening portion is greater than a width of the narrow portion, the exposing area is provided at the widening portion, and the second connecting portion is completely wrapped in the insulating block.

2. The electrical connector according to claim 1, wherein the first connecting portion and the second connecting portion both bend and extend, and the exposing area is located at a bending location of the first connecting portion.

3. The electrical connector according to claim 2, wherein the first connecting portion has a first narrow edge and a second narrow edge, the second connecting portion has a third narrow edge and a fourth narrow edge, the first narrow edge and the third narrow edge are coupled to each other, the first narrow edge and the second narrow edge at the widening portion protrude outward relatively than the first narrow edge and the second narrow edge at the narrow portion, and the first connecting portion and the second connecting portion are provided at an interval with a constant center distance.

4. The electrical connector according to claim 1, wherein the insulating block is provided with at least one groove, the groove is concavely provided from a surface of the insulating block toward a wide edge of the first connecting portion and a wide edge of the second connecting portion, and the groove extends along the first connecting portion.

5. The electrical connector according to claim 1, wherein the widening portion is further provided with a wrapping area being wrapped by the insulating block, the wrapping area is provided between the exposing area and the narrow portion along an extending direction of the first connecting portion.

6. The electrical connector according to claim 1, wherein each of the at least one terminal assembly further comprises a shielding shell, the shielding shell covers outside the insulating block, the shielding shell has a first side wall and a second side wall provided oppositely along an arrangement direction of the first signal terminal and the second signal terminal, the first connecting portion has a first narrow edge and a second narrow edge, the second connecting portion has a third narrow edge and a fourth narrow edge, the first narrow edge and the third narrow edge are coupled to each other, and the second narrow edge and the fourth narrow edge respectively face toward the first side wall and the second side wall;

a distance between the second narrow edge at the narrow portion and the first side wall is equal to a distance between the fourth narrow edge and the second side wall, and the first narrow edge and the second narrow edge at the widening portion protrude outward relatively than the first narrow edge and the second narrow edge at the narrow portion.

7. The electrical connector according to claim 1, wherein each of the at least one terminal assembly further comprises a shielding shell, the shielding shell covers outside the insulating block, and the exposing area and a side wall of the shielding shell face each other and are separated from each other by the air medium.

8. The electrical connector according to claim 1, wherein the insulating block comprises at least one first time insert-molding member and a second time insert-molding member, the first time insert-molding member fixes the first connecting portion and the second connecting portion, the first time insert-molding member has at least one mold positioning portion, the second time insert-molding member wraps outside the first connecting portion, the second connecting portion and the first time insert-molding member, and the first time insert-molding member wraps outside the narrow portion.

9. The electrical connector according to claim 8, wherein two mold positioning portions are formed by protruding outward from a same side of the first time insert-molding member, a filling slot is formed between the two mold positioning portions, and the filling slot is filled by the second time insert-molding member.

10. The electrical connector according to claim 8, wherein the first time insert-molding member is provided with at least one separation hole, portions of narrow edges of the first connecting portion and the second connecting portion being coupled to each other are exposed in the separation hole, and the separation hole is filled by the second time insert-molding member.

11. The electrical connector according to claim 10, wherein the first time insert-molding member further comprises at least two insert-molding blocks and at least one bridging portion, the bridging portion connects two adjacent ones of the insert-molding blocks, the bridging portion and the two adjacent ones of the insert-molding blocks collectively form two positioning recesses, the narrow edges at outer sides of the first connecting portion and the second connecting portion are respectively exposed in the two positioning recesses, and the separation hole is provided on the insert-molding blocks.

12. The electrical connector according to claim 1, wherein the second connecting portion has a constant width, and a width of the narrow portion is equal to a width of the second connecting portion.

* * * * *